(12) United States Patent
Mutalik et al.

(10) Patent No.: US 9,720,778 B2
(45) Date of Patent: Aug. 1, 2017

(54) LOCAL AREA NETWORK FREE DATA MOVEMENT

(71) Applicant: Actifio, Inc., Waltham, MA (US)

(72) Inventors: Madhav Mutalik, Southborough, MA (US); Siddharth Karnik, Lexington, MA (US); Yeganjaiah Gottemukkula, Lexington, MA (US); Durgesh Kumar Verma, Hyderabad (IN)

(73) Assignee: Actifio, Inc., Waltham, MA (US)

( * ) Notice: Subject to any disclaimer, the term of this patent is extended or adjusted under 35 U.S.C. 154(b) by 0 days.

(21) Appl. No.: 14/624,231

(22) Filed: Feb. 17, 2015

(65) Prior Publication Data

US 2015/0234611 A1 Aug. 20, 2015

Related U.S. Application Data

(60) Provisional application No. 61/940,163, filed on Feb. 14, 2014.

(51) Int. Cl.
*G06F 3/06* (2006.01)
*G06F 11/14* (2006.01)

(52) U.S. Cl.
CPC .... *G06F 11/1446* (2013.01); *G06F 2201/815* (2013.01); *G06F 2201/84* (2013.01)

(58) Field of Classification Search
CPC ...... G06F 3/0689; G06F 3/0619; G06F 3/067; G06F 3/065
USPC ............................................. 711/114, 6, 162
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |
| 5,857,208 A | 1/1999 | Ofek |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Jasmine Song
(74) *Attorney, Agent, or Firm* — Wilmer Cutler Pickering Hale and Dorr LLP

(57) ABSTRACT

Systems and methods for backing up data associated with storage area network (SAN) data stores connected to a backup device over a SAN such that the backup is performed without using a local area network (LAN). The systems and methods include receiving a snapshot of a virtual machine (VM), the VM being associated with a VM datastore disk, which is further associated with a unique ID. The unique ID associated with the VM datastore disk is compared with a unique ID associated with a disk available on the computing device. When the unique ID associated with the VM datastore disk matches the unique ID associated with the disk on the computing device, the disk on the computing device with the matching unique ID is opened for reading, and data from the opened disk is copied to a copy data storage pool over a storage area network.

17 Claims, 7 Drawing Sheets

(56) References Cited

U.S. PATENT DOCUMENTS

| | | |
|---|---|---|
| 5,963,962 A | 10/1999 | Hitz et al. |
| 6,065,018 A | 5/2000 | Beier et al. |
| 6,081,875 A | 6/2000 | Clifton et al. |
| 6,119,208 A | 9/2000 | White et al. |
| 6,131,148 A | 10/2000 | West et al. |
| 6,148,412 A | 11/2000 | Cannon et al. |
| 6,163,856 A | 12/2000 | Dion et al. |
| 6,192,444 B1 | 2/2001 | White et al. |
| 6,199,146 B1 | 3/2001 | Pence |
| 6,202,071 B1 | 3/2001 | Keene |
| 6,212,531 B1 | 4/2001 | Blea et al. |
| 6,226,759 B1 | 5/2001 | Miller et al. |
| 6,269,381 B1 | 7/2001 | St. Pierre et al. |
| 6,269,431 B1 | 7/2001 | Dunham |
| 6,324,548 B1 | 11/2001 | Sorenson |
| 6,330,614 B1 | 12/2001 | Aggarwal et al. |
| 6,434,681 B1 | 8/2002 | Armangau |
| 6,460,055 B1 | 10/2002 | Midgley et al. |
| 6,484,186 B1 | 11/2002 | Rungta |
| 6,487,561 B1 | 11/2002 | Ofek et al. |
| 6,557,089 B1 | 4/2003 | Reed et al. |
| 6,625,704 B2 | 9/2003 | Winokur |
| 6,654,772 B1 | 11/2003 | Crow et al. |
| 6,654,912 B1 | 11/2003 | Viswanathan et al. |
| 6,665,815 B1 | 12/2003 | Goldstein et al. |
| 6,668,264 B1 | 12/2003 | Patterson et al. |
| 6,772,302 B1 | 8/2004 | Thompson |
| 6,779,094 B2 | 8/2004 | Selkirk et al. |
| 6,823,336 B1 | 11/2004 | Srinivasan et al. |
| 6,823,436 B2 | 11/2004 | Krishnamurthy |
| 6,850,929 B2 | 2/2005 | Chang et al. |
| 6,898,688 B2 | 5/2005 | Martin et al. |
| 6,915,397 B2 | 7/2005 | Lubbers et al. |
| 6,928,526 B1 | 8/2005 | Zhu et al. |
| 6,948,039 B2 | 9/2005 | Biessener et al. |
| 6,957,362 B2 | 10/2005 | Armangau |
| 7,072,916 B1 | 7/2006 | Lewis et al. |
| 7,143,251 B1 | 11/2006 | Patterson |
| 7,222,194 B2 | 5/2007 | Kano et al. |
| 7,325,111 B1 | 1/2008 | Jiang |
| 7,346,623 B2 | 3/2008 | Prahlad et al. |
| 7,386,695 B2 | 6/2008 | Fuente |
| 7,428,657 B2 | 9/2008 | Yamasaki |
| 7,647,355 B2 | 1/2010 | Best et al. |
| 7,689,633 B1 | 3/2010 | Li et al. |
| 7,707,184 B1 | 4/2010 | Zhang et al. |
| 7,814,128 B2 | 10/2010 | Silvers et al. |
| 7,937,547 B2 | 5/2011 | Liu et al. |
| 8,037,032 B2 | 10/2011 | Pershin et al. |
| 8,139,575 B2 | 3/2012 | Biran et al. |
| 8,150,808 B2 | 4/2012 | Zha et al. |
| 8,161,077 B2 | 4/2012 | Zha et al. |
| 8,180,740 B1 | 5/2012 | Stager et al. |
| 8,180,742 B2 | 5/2012 | Claudatos et al. |
| 8,299,944 B2 | 10/2012 | Provenzano |
| 8,407,191 B1 | 3/2013 | Nanda |
| 8,468,174 B1 | 6/2013 | Yueh et al. |
| 8,548,944 B2 | 10/2013 | Yueh |
| 8,566,361 B2 | 10/2013 | Zha et al. |
| 8,706,833 B1 | 4/2014 | Bergant et al. |
| 8,788,769 B2 | 7/2014 | Abercrombie et al. |
| 9,098,432 B1 | 8/2015 | Bachu et al. |
| 9,135,033 B1 * | 9/2015 | Lee ................. G06F 9/455 |
| 2002/0129214 A1 | 9/2002 | Sarkar |
| 2003/0101321 A1 | 5/2003 | Ohran |
| 2003/0140070 A1 | 7/2003 | Kaczmarski et al. |
| 2004/0199570 A1 | 10/2004 | Terao |
| 2005/0066095 A1 | 3/2005 | Mullick et al. |
| 2005/0165794 A1 | 7/2005 | Mosescu |
| 2006/0074945 A1 | 4/2006 | Mori |
| 2009/0222496 A1 | 9/2009 | Liu et al. |
| 2011/0258161 A1 | 10/2011 | Constantinescu et al. |
| 2013/0339303 A1 | 12/2013 | Potter et al. |

OTHER PUBLICATIONS

American Megatrends, Inc., "StorTrends/ManageTrends (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

Edwards et al., "FlexVol: Flexible, Efficient File Volume Virtualization in WAFL," Usenix Association, Usenix '08: 2008 Usenix Annual Technical Conference, No Month Listed 2008 (pp. 129-142).

You et al., "Deep Store: An Archival Storage System Architecture," Proceedings of the 21st International Conference on Data Engineering, No Month Listed 2005 (12 pages).

Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).

EMC, "Backup of Oracle in EMC Symmetrix Environments with EMC NetWorker PowerSnap," Aug. 2008 (25 pages).

Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).

EMC, "EMC Celerra Version 5.6 Technical Primer: SLA-Driven Replication with Celerra Replicator (V2): Technology Concepts and Business Considerations," Jul. 2008 (20 pages).

EMC, "EMC DL1500 and DL3000 with EMC NetWorker: Best Practices Planning," Jul. 2009 (36 pages).

EMC, "EMC TimeFinder Product Description Guide," No Date Listed (34 pages).

EMC, "Next-Generation Backup-to-Disk: Building the Foundation for Effective Operational Recovery Management," Jan. 31, 2005 (9 pages).

(56) References Cited

OTHER PUBLICATIONS

EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. In Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.iet-forg/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM Adstar Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("The '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("The '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).

(56) References Cited

OTHER PUBLICATIONS

Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("The '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM Adstar Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("The '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).

Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrators Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrators Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).

(56) References Cited

OTHER PUBLICATIONS

Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrators Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).

* cited by examiner

LOCAL AREA NETWORK FREE DATA MOVEMENT

CROSS-REFERENCES TO RELATED APPLICATIONS

This application claims priority under 35 U.S.C. 119(e) to U.S. application Ser. No. 61/940,163, entitled "LOCAL AREA NETWORK FREE DATA MOVEMENT", filed Feb. 14, 2014, the contents of which is hereby incorporated by reference in its entirety.

TECHNICAL FIELD

The present disclosure relates to data management, specifically to local area network (LAN) free data movement.

BACKGROUND

Traditionally, LAN Free Data movement is only available when the storage for a virtual machine being backed up is in an inband datastore. LAN-based backup can be much slower than LAN Free-based backup, for example, storage area network (SAN) based backup.

SUMMARY OF THE INVENTION

The techniques described herein can provide a sideband feature that can allow LAN-free data capture or backup of Virtual Machines (VMs) or other datastores even though the VM or datastore is not inband.

The disclosed subject matter includes a computerized method of backing up data associated with storage area network (SAN) data stores connected to a backup device over a SAN such that the backup is performed without using a local area network (LAN). The method includes receiving, by a computing device, a snapshot of a virtual machine (VM) corresponding to a request to back up data associated with the VM, the VM being associated with a VM datastore and a VM datastore disk, wherein the VM datastore disk is associated with a unique ID. The method includes comparing, by the computing device, the unique ID associated with the VM datastore disk with a unique ID associated with a disk available on the computing device. The method includes determining, by the computing device, the unique ID associated with the VM datastore disk matches the unique ID associated with the disk on the computing device. The method includes opening for reading, by the computing device, the disk on the computing device with the matching unique ID. The method includes copying, by the computing device, data from the opened disk to a copy data storage pool over a storage area network, thereby backing up data associated with storage area network (SAN) data stores connected to a backup device over a SAN such that the backup is performed without using a local area network (LAN).

The disclosed subject matter includes computing system for backing up data associated with storage area network (SAN) data stores connected to a backup device over a SAN such that the backup is performed without using a local area network (LAN). The computing system includes a processor and a memory coupled to the processor and including computer-readable instructions that, when executed by the processor, cause the processor to receive a snapshot of a virtual machine (VM) corresponding to a request to back up data associated with the VM, the VM being associated with a VM datastore and a VM datastore disk, wherein the VM datastore disk is associated with a unique ID. The computer-readable instructions cause the processor to compare the unique ID associated with the VM datastore disk with a unique ID associated with a disk available on the computing device. The computer-readable instructions cause the processor to determine the unique ID associated with the VM datastore disk matches the unique ID associated with the disk on the computing device. The computer-readable instructions cause the processor to open the disk on the computing device with the matching unique ID. The computer-readable instructions cause the processor to copy data from the opened disk to a copy data storage pool over a storage area network, thereby backing up data associated with storage area network (SAN) data stores connected to a backup device over a SAN such that the backup is performed without using a local area network (LAN).

The disclosed subject matter includes a non-transitory computer readable medium having executable instructions operable to cause an apparatus to receive a snapshot of a virtual machine (VM) corresponding to a request to back up data associated with the VM, the VM being associated with a VM datastore and a VM datastore disk, wherein the VM datastore disk is associated with a unique ID. The executable instructions are operable to cause the apparatus to compare the unique ID associated with the VM datastore disk with a unique ID associated with a disk available on the computing device. The executable instructions are operable to cause the apparatus to determine the unique ID associated with the VM datastore disk matches the unique ID associated with the disk on the computing device. The executable instructions are operable to cause the apparatus to open the disk on the computing device with the matching unique ID. The executable instructions are operable to cause the apparatus to copy data from the opened disk to a copy data storage pool over a storage area network, thereby backing up data associated with storage area network (SAN) data stores connected to a backup device over a SAN such that the backup is performed without using a local area network (LAN).

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

The present disclosure relates to U.S. patent application Ser. No. 13/920,981, filed on Jun. 18, 2013, entitled "System and method for incrementally backing up out-of-band data," which is hereby incorporated by reference herein in its entirety.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

In some embodiments, when capturing the data of a Virtual Machine, a backup application may need to create a snapshot of the virtual image, and then copy the data out of the snapshot either over the local area network (LAN) or over the storage area network (SAN) into copy data storage. At the end of the backup, the snapshot can be deleted.

Previously if the datastore were in-band, that is, the logical unit number (LUN) containing the data were presented to the VMware hypervisor by the copy data server, then the backup was done over the SAN (i.e., a LAN-free backup). In any other datastore configuration, the data movement was over the LAN.

In some embodiments, a sideband feature as described herein can allow LAN free data capture or backup of Virtual Machines (VMs) when Datastores that the Virtual Machines reside on use unique identifiers (e.g., a FiberChannel LUN (FC-Based LUN)). In some embodiments, LAN free data movement can be performed even though the datastore is not inband. LAN free backup is usually faster, with less impact on other systems in a data center, and more secure. In some embodiments, data movement can be performed over a SAN to provide for SAN-based data movement even when the datastore is not inband. Such techniques can be used, for example, by systems that generate copy data, where the system may have both in-band and out-of-band disks. The techniques can be used to take an out-of-band disk and allow access to the disk from the copy data system, such as by making an out-of-band disk that can copy of the SAN.

In some embodiments, in any configuration where the datastore resides on an FC-based LUN, LAN free data movement is enabled. In some embodiments, the LUN containing the datastore can be zoned to the Copy Data Server.

Figure 1:
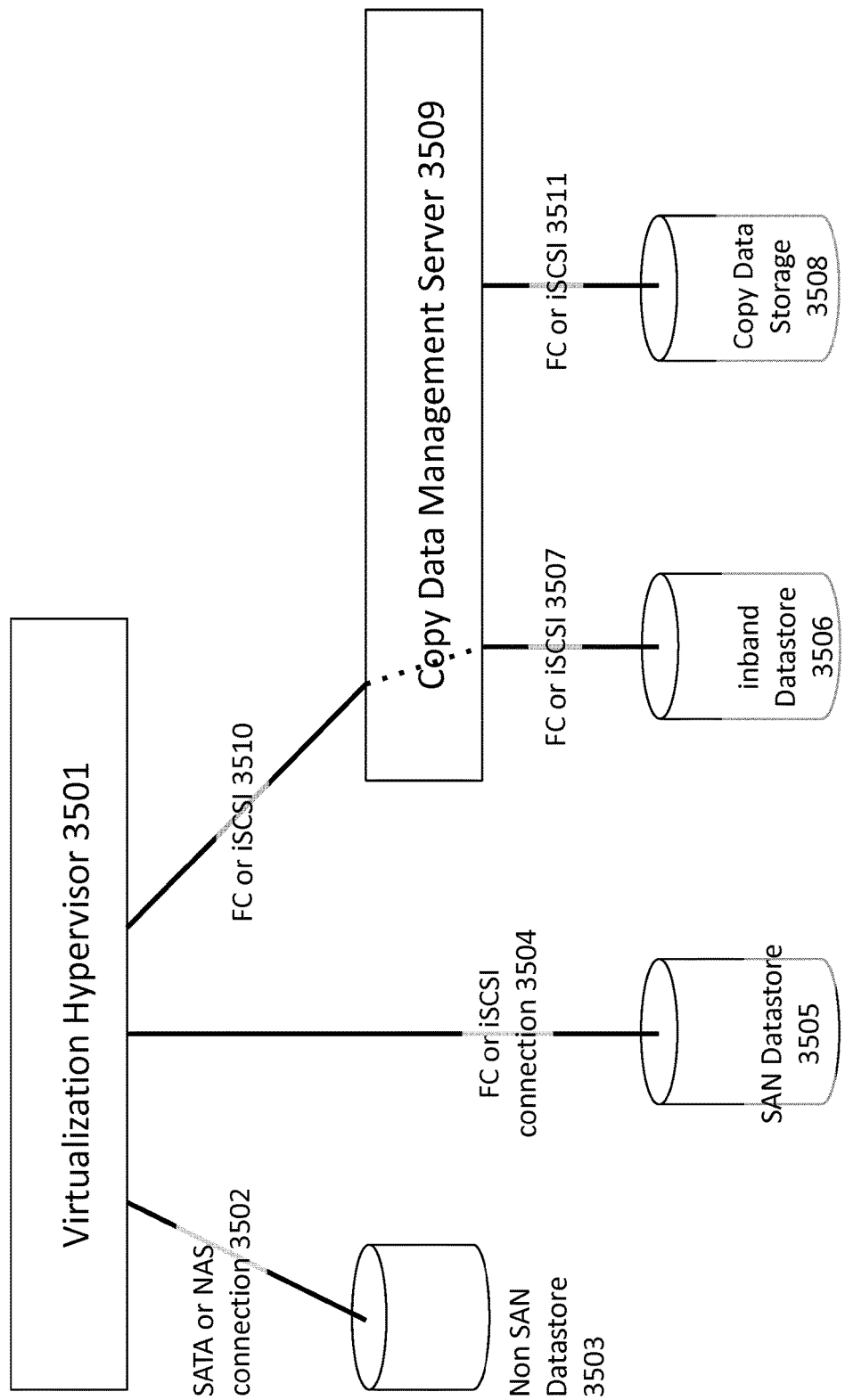
FIG. 1 illustrates the types of storage in a Virtualization Hypervisor environment, according to some embodiments of the present disclosure.

FIG. 1 illustrates the types of storage in a Virtualization Hypervisor environment, according to some embodiments of the present disclosure. FIG. 1 depicts a Virtualization Hypervisor 3501, a Copy Data Management Server 3509, a Non-SAN Datastore 3503, a SAN Datastore 3505, an inband Datastore 3506, and a Copy Data Storage 3508. FIG. 1 further depicts Virtualization Hypervisor 3501 connected to Copy Data Management Server 3509 by a Fiber Channel (FC) or Internet Small Computer System Interface (iSCSI) connection 3510, Virtualization Hypervisor 3501 connected to SAN Datastore 3505 by an FC or iSCSI connection 3504, and Virtualization Hypervisor 3501 connected to Non-SAN Datastore 3503 by a Serial ATA (SATA) or Network Attached Storage (NAS) connection 3502. FIG. 1 also depicts Copy Data Management Server 3509 connected to inband Datastore 3506 by an FC or iSCSI connection 3507, and Copy Data Management Server 3509 connected to Copy Data Storage 3508 by an FC or iSCSI connection 3511.

In some embodiments, Virtualization Hypervisor 3501 can be an ESX Host from VMware. Virtualization Hypervisor 3501 can store its data, including the configuration and storage for the guest operating systems of virtual machines in datastores 3503, 3505 and 3506.

In some embodiments, one type of datastore can be non-SAN datastore 3503. Non-SAN datastore 3503 can reside on an internal drive within the Hypervisor frame, or in an external Network Attached Storage (NAS) Share. The connection between non-SAN datastore and Virtualization Hypervisor 3501 can be an SATA or an NAS protocol 3502.

In some embodiments, another type of datastore can be SAN datastore 3505. SAN datastore 3505 can reside in an external array, and can be connected to Hypervisor through iSCSI or FC 3504.

In some embodiments, another type of datastore can be inband datastore 3506. Inband datastore 3506 can reside in an external array which can be presented to Copy Management Server 3509, over an iSCSI or Fibrechannel connection 3507, which Copy Management Server 3509 can present to Virtualization Hypervisor 3501.

In some embodiments, additional data storage capacity 3508 can be made available to Copy Management Server 3509. Copy Management Server 3509 can use this additional storage for various copy storage pools.

Previously, LAN-free data movement was only available when the storage for the virtual machine being backed up was in the inband datastore 3506. The sideband feature, as described herein, enables the LAN free backup of SAN Datastore 3505.

Figure 2:
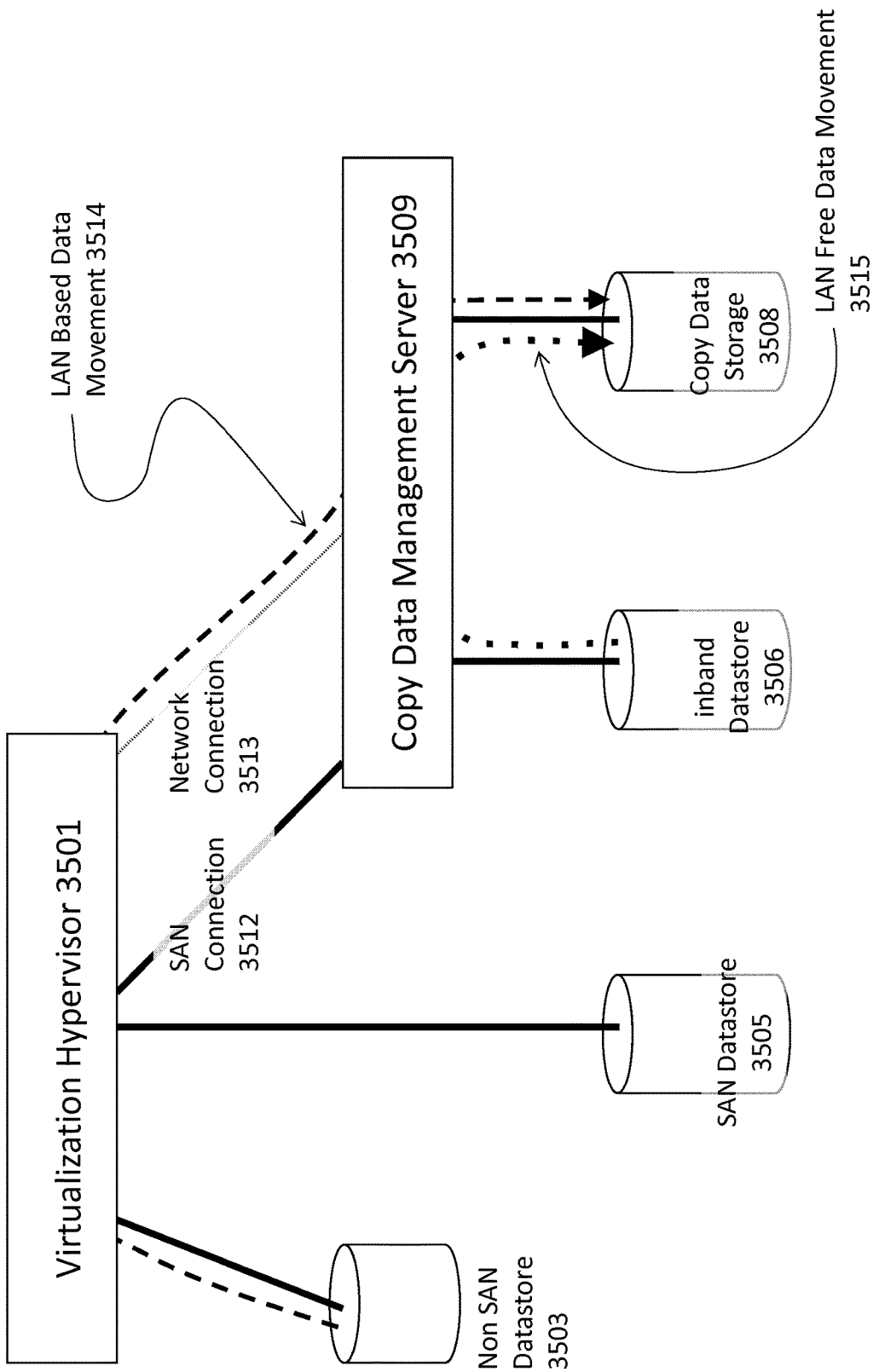
FIG. 2 illustrates LAN Based and LAN Free Data Movement, according to some embodiments of the present disclosure.

FIG. 2 illustrates LAN-based and LAN-free data movement, according to some embodiments of the present disclosure. FIG. 2 depicts a SAN connection 3512 and Network connection 3513 between Virtualization Hypervisor 3501 and Copy Management Data Server 3509. The Virtualization Hypervisor 3501 is also in communication with a non-SAN datastore 3503 and SAN datastore 3505. The Copy Data Management Server 3509 is in communication with inband datastore 3506 and copy data storage 3508.

In some embodiments, there can be a SAN connection 3512 between Virtualization Hypervisor 3501 and Copy Data Management Server. There can also be a Network Connection 3513 between Virtualization Hypervisor 3501 and Copy Data Management Server 3509.

Dashed Arrow 3514 shows a path taken by LAN Based Data Movement when backing up a VM that has its storage in Non-SAN Datastore 3503. The data can be read by Virtualization Hypervisor 3501 and then sent over the Network or LAN 3513 to Copy Data Management Server 3509. Copy Data Management Server can write the data to Copy Data Storage 3508. The Data travels over the LAN, and can be considered LAN Based movement.

Dotted Arrow 3515 shows a path taken by LAN Free Data Movement when backing up a VM that has its storage on inband Datastore 3506. The data can be read by Copy Data Management Server 3509 over the SAN and written to Copy Data Storage 3508. The data does not travel over the LAN, and therefore can be considered LAN Free Data movement.

Figure 3:
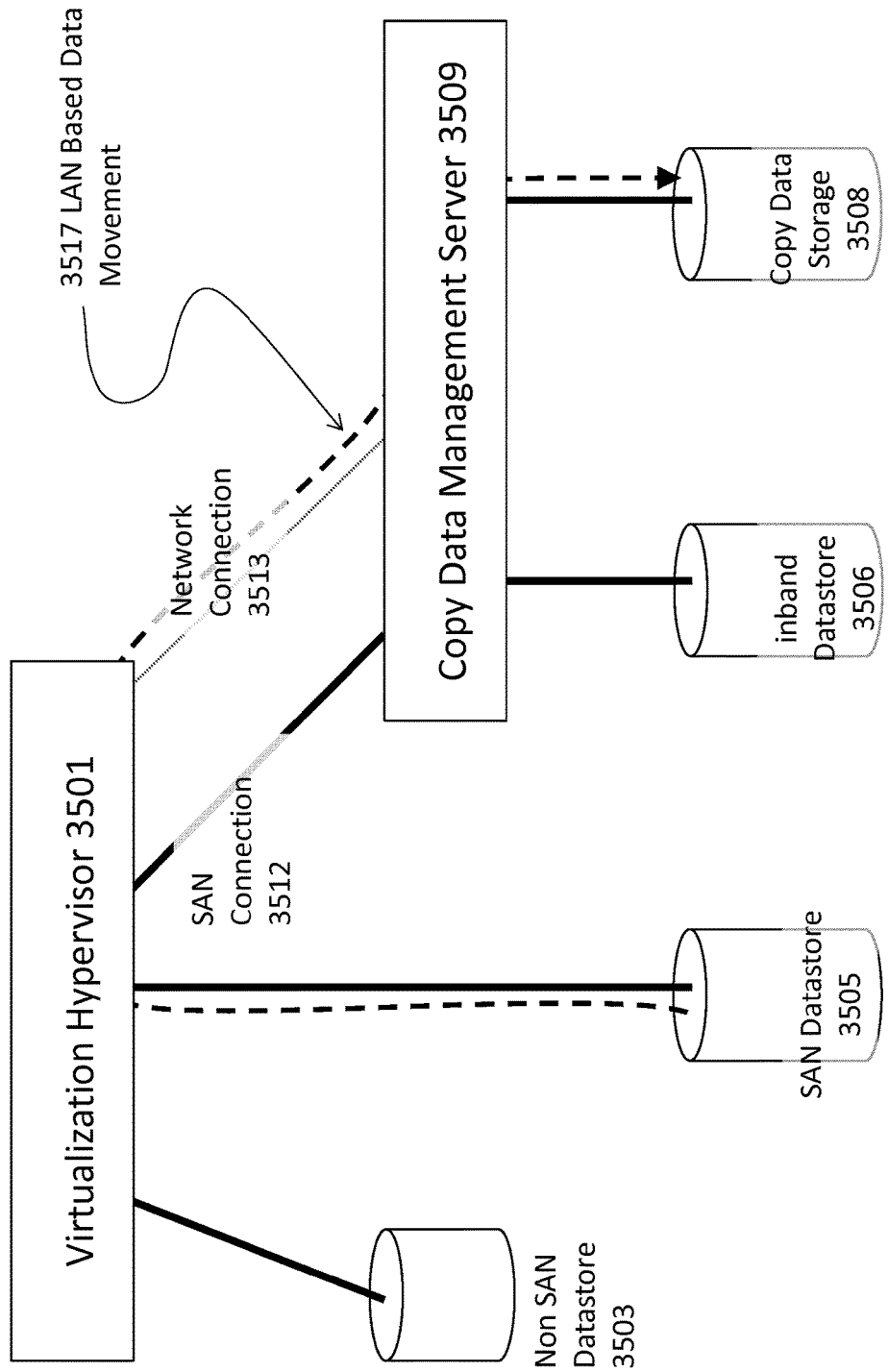
FIG. 3 illustrates LAN Based Data Movement from a SAN Datastore.

FIG. 3 illustrates LAN Based Data Movement from a SAN Datastore. FIG. 3 depicts a SAN connection 3512 and Network connection 3513 between Virtualization Hypervisor 3501 and Copy Management Data Server 3509. The Virtualization Hypervisor 3501 is also in communication with a non-SAN datastore 3503 and SAN datastore 3505. The Copy Data Management Server 3509 is in communication with inband datastore 3506 and copy data storage 3508.

Without the zoning process, as described herein, Copy Data Management Server 3509, can be unaware that the datastore containing the virtual machine files can be accessed. Copy Data Management Server 3509 can use a hypervisor's vendor provided application programming interface to read the data over the network, which takes a path from SAN Based Storage 3505 through Virtualization Hypervisor, 3501 over the LAN interface 3513, to Copy Management Server 3509. This results in LAN Based data movement for a SAN based datastore, 3517.

Figure 4:
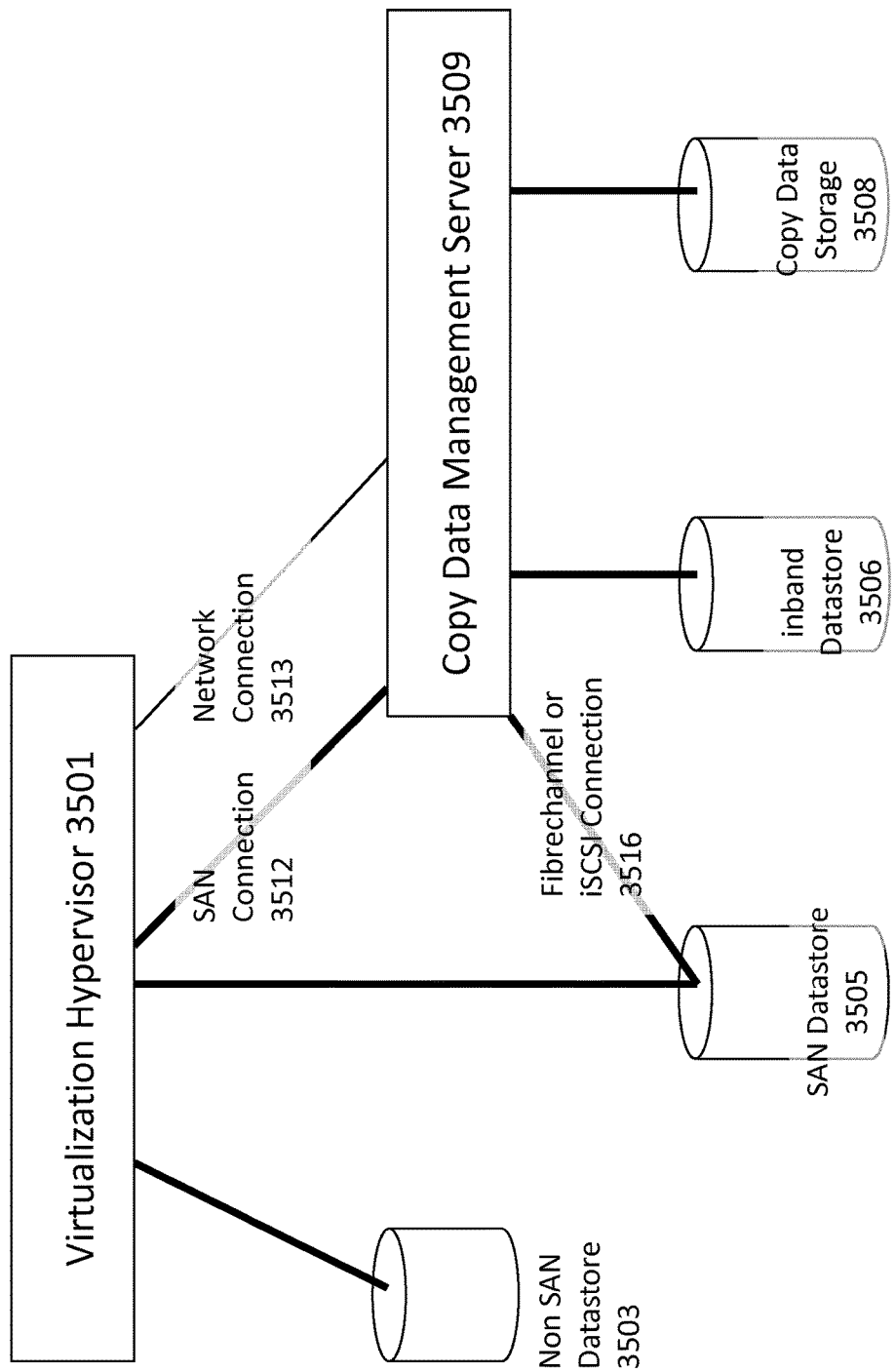
FIG. 4 illustrates the Zoning and Mapping requirements for LAN Free Data Movement from a SAN Based Datastore, according to some embodiments of the present disclosure.

FIG. 4 illustrates the Zoning and Mapping requirements for LAN Free Data Movement from a SAN Based Datastore, according to some embodiments of the present disclosure. FIG. 4 depicts a SAN connection 3512 and Network connection 3513 between Virtualization Hypervisor 3501 and Copy Management Data Server 3509. The Virtualization Hypervisor 3501 is also in communication with a non-SAN datastore 3503 and SAN datastore 3505. The Copy Data Management Server 3509 is in communication with inband datastore 3506 and copy data storage 3508. FIG. 4 further depicts a SAN technology connection (e.g., FC or iSCSI Connection) 3516 between SAN Datastore 3505 and Copy Data Management Server 3509.

In some embodiments, SAN Based Datastore 3505 can be zoned to Copy Data Management Server 3509, so that Copy Data Management Server 3509 can directly read data from SAN Datastore 3505 over a Fibrechannel or iSCSI SAN connection 3516.

In some embodiments, this zoning can be accomplished by configuring SAN switches so that SAN Datastore 3505 is visible to Copy Data Management Server 3509. In some embodiments, storage and hosts can be connected by cables to SAN switches. The SAN switches can be configured to present certain disks to certain hosts, and other disks to other hosts. In some embodiments, configuring a SAN switch comprises taking an existing configuration of a SAN switch, which allows the datastore disk to be seen by one or more hypervisor hosts, and modifying it to allow Copy Management Server 3509 to also see the disk. The array containing the datastore can be configured to map the disks making up the datastore to Copy Management Server 3509.

In some embodiments, Copy Management Server 3509 can see this zoned and mapped disk as a Managed disk. A managed disk is a disk where the server can control the inputs and outputs of the disk.

Figure 5:
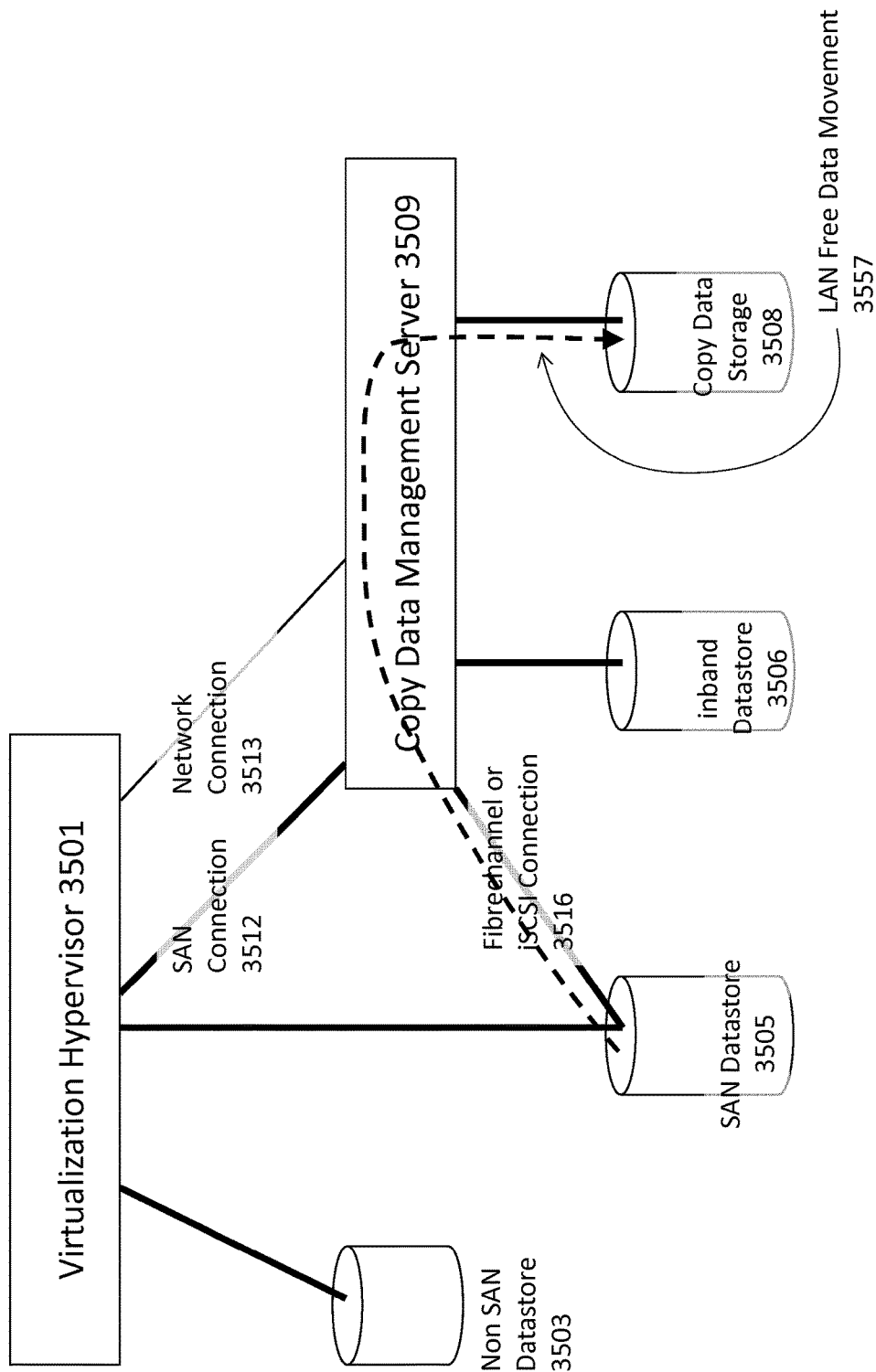
FIG. 5 illustrates the configuration for SAN based Data Movement for a SAN based datastore, according to some embodiments of the present disclosure.

FIG. 5 illustrates the configuration for SAN based Data Movement for a SAN based datastore, according to some embodiments of the present disclosure. FIG. 5 depicts a SAN connection 3512 and Network connection 3513 between Virtualization Hypervisor 3501 and Copy Management Data Server 3509. The Virtualization Hypervisor 3501 is also in communication with a non-SAN datastore 3503 and SAN datastore 3505. The Copy Data Management Server 3509 is in communication with inband datastore 3506 and copy data storage 3508. FIG. 5 further depicts a SAN technology connection (e.g., FC or iSCSI Connection) 3516 between SAN Datastore 3505 and Copy Data Management Server 3509.

In some embodiments, a SAN based datastore 3505 can be zoned in accordance to the requirements of Copy Management Server 3509. In some embodiments, Data Movement can occur by Copy Data Management Server 3509 recognizing that characteristics (e.g., SCSI ID) of one of the disks visible to it over the SAN is the same as the characteristics (e.g., SCSI ID) of the disk of SAN Datastore 3505 as reported by Virtualization Hypervisor 3501. In some embodiments, each disk can have a unique characteristic that differentiates the disk from other disks. Data Management Server 3505 can then use the characteristic (e.g., SCSI ID) to read the data directly from Copy Data Storage 3508 resulting in the path depicted by 3557, which is a LAN Free data movement path. While the connection 3516 between the SAN Datastore 3505 and the Copy Data Management Server 3509 is shown as a FibreChannel or iSCSI Connection, one of skill in the art can appreciate that the connection can use any SAN technologies, including those not illustrated in FIG. 5 such as Infiniband.

Figure 6:
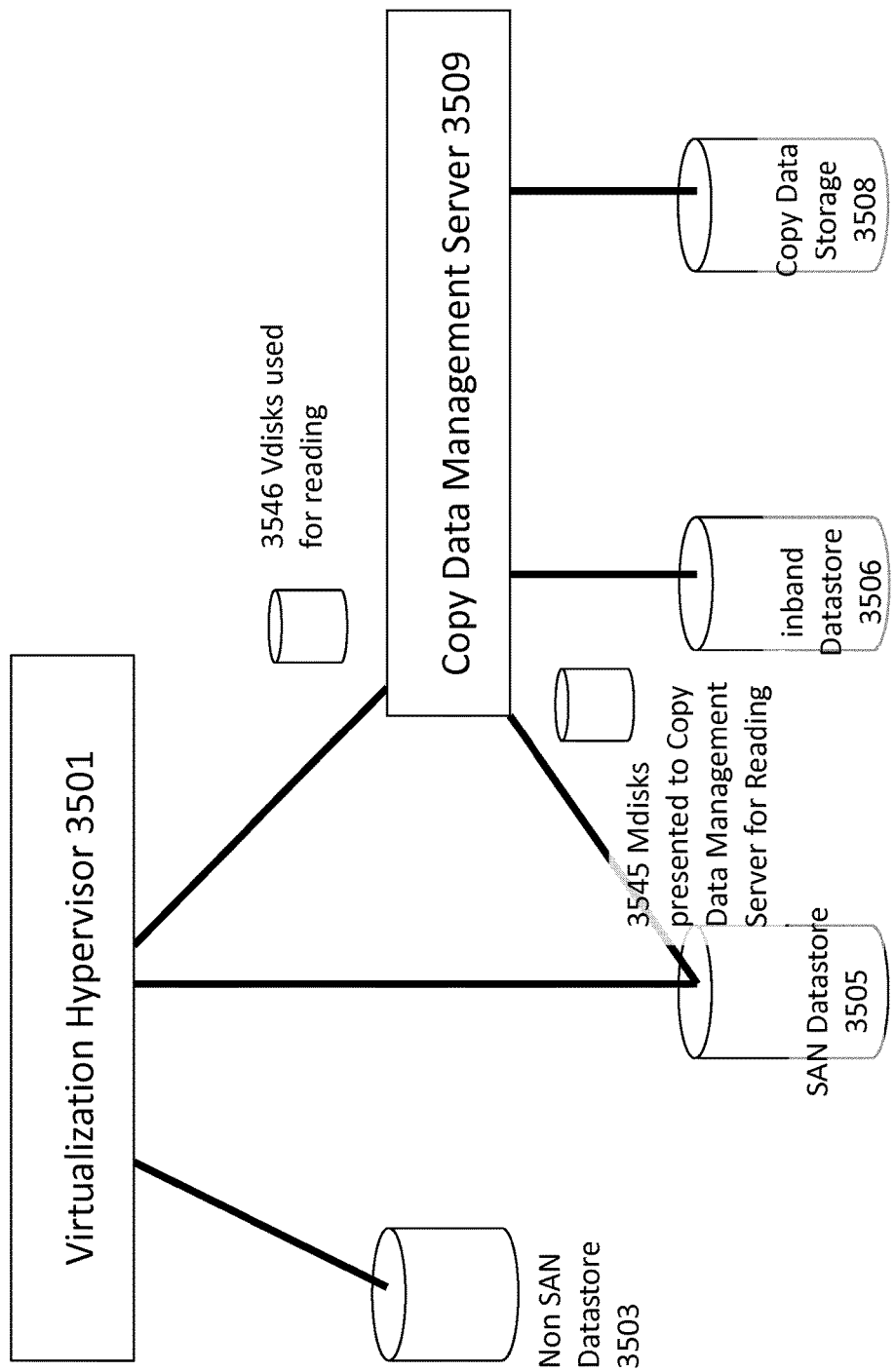
FIG. 6 illustrates how Copy Management Server uses Managed Disks and Virtual Disks, according to some embodiments of the present disclosure.

FIG. 6 illustrates how Copy Management Server uses Managed Disks and Virtual Disks, according to some embodiments of the present disclosure. FIG. 6 depicts the Virtualization Hypervisor 3501 and the Copy Management Data Server 3509. The Virtualization Hypervisor 3501 is also in communication with the non-SAN datastore 3503, the SAN datastore 3505 and the Copy Data Management Server 3509. The Copy Data Management Server 3509 is also in communication with SAN Datastore 3505, inband datastore 3506 and copy data storage 3508. FIG. 6 depicts Virtual disks 3546 and Managed Disks 3545.

In some embodiments, Copy Management Server 3509 probes all of the disks available to it and queries their unique IDs. In some embodiments, Copy Management Server 3509 can probe all of the Managed Disks 3545 that are mapped to it over the SAN, querying their SCSI ID, and reading their disk labels. If Copy Management Server 3509 determines that one of the Managed Disks 3545 is the same as the disk that makes up the datastore 3505 that is to be protected, it can create a Virtual Disk 3546 that is an image mapped version of the Managed disk 3545. Copy Management Server 3509 can create Virtual Disk 3546 with caching disabled so that every block of data is read directly from the managed disk. This ensures that the data that is backed up is current, and not stale data from the cache of Copy Management Server 3509.

Figure 7:
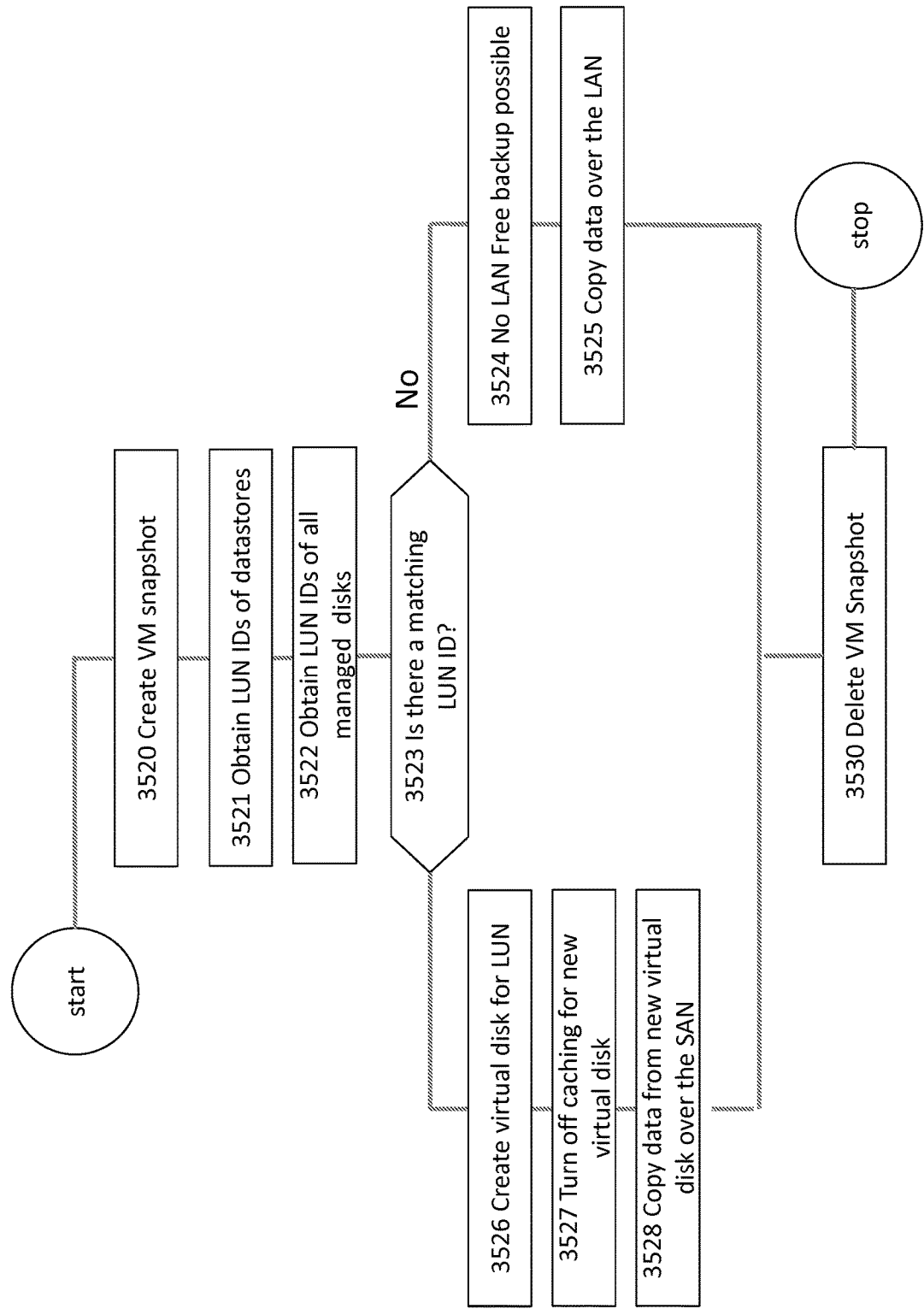
FIG. 7 shows the flowchart of the LAN free backup of the SAN based LUN, according to some embodiments of the present disclosure.

FIG. 7 shows a flowchart of the LAN free backup of the SAN based LUN, according to some embodiments of the present disclosure.

With reference to FIGS. 3-6, for example, at the start of the backup, in step 3520, Copy Management Server 3509 creates a snapshot of the Virtual Machine to be backed up. This step provides a stable point in time image to back up.

Next, in step 3521, Copy Management Server 3509 uses the vendor's application programming interface to obtain unique IDs (e.g., LUN IDs, SCSI IDs, and disk labels) of the disks that make up the datastores of the virtual machine. For example, the unique ID can be a disk label or other ID that is written at the front of the disk to identify the disk. Such unique IDs are beneficial because they can identify the disk regardless of which path the disk is seen or accessed through. For example, one way of identifying a disk is by conveying which disk it is on a particular controller (e.g., the first disk on the first controller). Instead, unique IDs such as labels can be written to the front of the disk so that multiple paths can access the disk (e.g., for redundancy) and identify the disk using the unique ID (e.g., rather than needing to map that the first disk on first controller is same as second disk on second controller, and so on). So a lot use a unique disk label on each disk so can uniquely ID the disk.

In some embodiments, datastore disks (e.g., 3503, 3505, 3506), whether they be SAN based or non-SAN based, are visible to Virtualization Hypervisor 3501. The hypervisor vendor can provide an Application programming interface that allows access to the disks through the hypervisor host. In step 3522 Copy Management Server 3509 queries all of the Managed disks 3545 that it can see across the SAN, to obtain their unique IDs (e.g., LUN IDs, SCSI IDs and disk labels).

In step 3523, Copy Management Server 3509 compares all of the SCSI IDs of the datastores to the SCSI IDs of the Managed Disks 3545. If no match is found, in 3524, Copy Management Server 3509 recognizes that a LAN Free Backup is not possible. In step 3525, Copy Management Server 3509 reads the data over the LAN, and completes the backup, going to step 3530 where it deletes the Virtual Machine snapshot, and completes the backup.

If a match is found in step 3523, Copy Management Server 3509 prepares for a LAN Free backup. In step 3526, Copy Management Server 3509 creates a Virtual disk 3546 that is an image of the Managed disk 3545 whose ID matches the datastore disk ID. In step 3527, Copy Management Server 3509 turns off the caching for the newly created Virtual disk 3546. In step 3528, the Copy Management Server 3509 opens for reading and reads the data from the Virtual disk 3546 over the SAN and writes it to Copy Data Storage pool 3508. In step 3530, Copy Management Server 3509 deletes the Virtual Machine snapshot and completes the backup.

In some embodiments, a safety policy is implemented to prevent accidental writing to the SAN datastore Implementing the safety policy can include comparing the unique ID of any disk being opened for writing by the computing device against the unique IDs of all datastore disks (e.g., datastore disks presented by the SAN) to ascertain that the disk is not a datastore disk. The opening process is rejected if a match is found. Implementing the safety policy can also include examining the contents of the disk being opened for the signature pattern of a datastore. The opening process is rejected if a match is found.

For example, once a disk is exposed to the copy data store, there can be a risk that the copy data management server accidentally writes to the disk (e.g., because there is some software problem, or a program can trigger the copy data management server and ask to use the disk for something). Therefore the safety policy serves as a security layer before being able to write to any disk (e.g., before opening the disk for writing). The safety policy verifies that the disk is not a data store by looking at the pattern of data on the disk. For example, if a disk contains a data store there is often a particular structure and/or values on the disk (e.g., the first two blocks identify what type of data store and the version of the data store). If a disk has such a pattern, the system can determine that the disk is a data store and can prevent writing to the disk.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. A computerized method of backing up data associated with an out-of-band storage area network (SAN) datastore connected to a backup computing device over a SAN such that the backup is performed without using a local area network (LAN), the method comprising:
    receiving, by the backup computing device, a request to back up data associated with a virtual machine (VM), the VM being associated with a VM datastore and a VM datastore disk in the SAN, wherein:
        the VM datastore disk is associated with a unique ID; and
        the backup computing device is out-of-band with the VM datastore such that the VM directly modifies the VM datastore without the modifications passing through the backup computing device;
    comparing, by the backup computing device, the unique ID associated with the VM datastore disk with a unique ID associated with a disk available to the backup computing device, wherein the disk is in a copy data storage pool;
    determining, by the backup computing device, that the unique ID associated with the VM datastore disk matches the unique ID associated with the disk available to the backup computing device;
    opening for reading, by the backup computing device, the VM datastore disk;
    disabling, by the backup computing device, caching by the VM datastore disk so that reads to the VM datastore disk do not use caching; and
    copying, by the backup computing device, a snapshot of the VM datastore from the opened VM datastore disk to the disk in the copy data storage pool over the SAN, thereby backing up the VM datastore from the VM datastore disk that is out-of-band to the backup computing device, wherein the backup is performed over the (SAN) and not over the LAN.

2. The computerized method of claim 1, further comprising:
    determining that the unique ID associated with the VM datastore disk does not match the unique ID associated with the disk on the backup computing device; and
    copying data from the VM to a copy data storage pool over a local area network.

3. The computerized method of claim 1, wherein the unique ID comprises a logical unit number (LUN) ID, a small computer system interface (SCSI) ID, or a disk label.

4. The computerized method of claim 1, wherein the VM datastore disk is presented to the backup computing device by a SAN datastore.

5. The computerized method of claim 4, wherein the backup computing device is connected to the SAN datastore by a fiber channel or an Internet Small Computer System Interface (iSCSI) SAN connection.

6. The computerized method of claim 1, further comprising implementing a safety policy to prevent accidental writing to the SAN datastore.

7. The computerized method of claim 6, wherein implementing the safety policy comprises:
    comparing a unique ID of a disk associated with a write operation by the backup computing device against a unique ID of a datastore disk associated with the SAN datastore; and
    cancelling the write operation when the unique ID of a disk associated with a write operation by the backup computing device matches the unique ID of the datastore disk associated with the SAN datastore.

8. The computerized method of claim 6, wherein implementing the safety policy comprises:
    determining the contents of a disk associated with a write operation contain a signature pattern associated with the SAN datastore; and
    cancelling the write operation.

9. A backup computing system for backing up data associated with an out-of-band storage area network (SAN) datastore connected to the a backup computing system over a SAN such that the backup is performed without using a local area network (LAN), the computing system comprising:
    a processor; and
    a memory coupled to the processor and including computer-readable instructions that, when executed by the processor, cause the processor to:
        receive a request to back up data associated with a virtual machine (VM), the VM being associated with a VM datastore and a VM datastore disk in the SAN, wherein:
            the VM datastore disk is associated with a unique ID; and
            the backup computing system is out-of-band with the VM datastore such that the VM directly modifies the VM datastore without the modifications passing through the backup computing system;
        compare the unique ID associated with the VM datastore disk with a unique ID associated with a disk available to the backup computing system, wherein the disk is in a copy data storage pool;
        determine the unique ID associated with the VM datastore disk matches the unique ID associated with the disk available to the backup computing system;
        open the VM datastore disk for reading;
        disable caching by the VM datastore disk so that reads to the VM datastore disk do not use caching; and
        copy a snapshot of the VM datastore from the opened VM datastore disk to the disk in the copy data storage pool over the SAN, thereby backing up the VM datastore from the VM datastore disk that is out-of-band to the backup computing system, wherein the backup is performed over the (SAN) and not over the LAN.

10. The computing system of claim 9, wherein the computer-readable instructions cause the processor to:
    determine that the unique ID associated with the VM datastore disk does not match the unique ID associated with the disk on the backup computing system; and
    copy data from the VM to a copy data storage pool over a local area network.

11. The computing system of claim 9, wherein the unique ID comprises a logical unit number (LUN) ID, a small computer system interface (SCSI) ID, or a disk label.

12. The computing system of claim 9, wherein the VM datastore disk is presented to the backup computing system by a SAN datastore.

13. The computing system of claim 12, wherein the backup computing system is connected to the SAN datastore by a fiber channel or an Internet Small Computer System Interface (iSCSI) SAN connection.

14. The computing system of claim 9, wherein the computer-readable instructions cause the processor to implement a safety policy to prevent accidental writing to the SAN datastore.

15. The computing system of claim 14, wherein implementing the safety policy comprises:
    comparing a unique ID of a disk associated with a write operation by the backup computing system against a unique ID of a datastore disk associated with the SAN datastore; and
    cancelling the write operation when the unique ID of a disk associated with a write operation by the backup computing system matches the unique ID of the datastore disk associated with the SAN datastore.

16. The computing system of claim 14, wherein implementing the safety policy comprises:
    determining the contents of a disk associated with a write operation contain a signature pattern associated with the SAN datastore; and
    cancelling the write operation.

17. A non-transitory computer readable medium having executable instructions operable to cause an apparatus to:
    receive a request to back up data associated with a virtual machine (VM), the VM being associated with a VM datastore and a VM datastore disk in the SAN, wherein:
        the VM datastore disk is associated with a unique ID; and
        the apparatus is out-of-band with the VM datastore such that the VM directly modifies the VM datastore without the modifications passing through the apparatus;
    compare the unique ID associated with the VM datastore disk with a unique ID associated with a disk available to the apparatus, wherein the disk is in a copy data storage pool;
    determine the unique ID associated with the VM datastore disk matches the unique ID associated with the disk available to the apparatus;
    open the VM datastore disk for reading;
    disable caching by the VM datastore disk so that reads to the VM datastore disk do not use caching; and
    copy a snapshot of the VM datastore from the opened VM datastore disk to the disk in the copy data storage pool over the SAN, thereby backing up the VM datastore from the VM datastore disk that is out-of-band to the apparatus, wherein the backup is performed over the (SAN) and not the LAN.

* * * * *